United States Patent
Wang et al.

(10) Patent No.: US 9,417,100 B2
(45) Date of Patent: Aug. 16, 2016

(54) METHOD OF ASSISTED MOUNTING AND ERROR COMPENSATION FOR ABSOLUTE GRATING RULER

(71) Applicant: Guangdong University of Technology, Guangzhou (CN)

(72) Inventors: Han Wang, Guangzhou (CN); Zhixiong Wu, Guangzhou (CN); Xin Chen, Guangzhou (CN); Xindu Chen, Guangzhou (CN); Bin Chen, Guangzhou (CN); Xiaohai Wei, Guangzhou (CN); Chaolong Fan, Guangzhou (CN)

(73) Assignee: Guangdong University of Technology (CN)

( * ) Notice: Subject to any disclaimer, the term of this patent is extended or adjusted under 35 U.S.C. 154(b) by 0 days.

(21) Appl. No.: 14/439,096

(22) PCT Filed: Jan. 28, 2015

(86) PCT No.: PCT/CN2015/071694
§ 371 (c)(1),
(2) Date: Apr. 28, 2015

(87) PCT Pub. No.: WO2015/113493
PCT Pub. Date: Aug. 6, 2015

(65) Prior Publication Data
US 2016/0025522 A1      Jan. 28, 2016

(30) Foreign Application Priority Data
Jan. 28, 2014   (CN) .......................... 2014 1 0040694

(51) Int. Cl.
*G01D 5/38*       (2006.01)
*G01D 5/347*      (2006.01)

(52) U.S. Cl.
CPC . *G01D 5/347* (2013.01); *G01D 5/38* (2013.01)

(58) Field of Classification Search
CPC ................................ G01D 5/347; G01D 5/38
See application file for complete search history.

(56) References Cited

U.S. PATENT DOCUMENTS

| 5,038,491 A | 8/1991 | Tsukiji et al. |
| 2007/0241270 A1 | 10/2007 | Saidan et al. |

(Continued)

FOREIGN PATENT DOCUMENTS

| CN | 101055195 A | 10/2007 |
| CN | 101162139 A | 4/2008 |

(Continued)

OTHER PUBLICATIONS

Chen, Binghua et al., "Ways of Automatic Pipe Length Measurement and Its Error Analysis", Journal of Mechanical & Electrical Engineering. No. 3, vol. 24, Mar. 31, 2007, pp. 13-15 (English Abstract provided).

(Continued)

*Primary Examiner* — Tony Ko
(74) *Attorney, Agent, or Firm* — Lerner, David, Littenberg, Krumholz & Mentlik, LLP

(57) ABSTRACT

A method of assisted mounting and error compensation for absolute grating ruler comprises: (1) when mounting a CMOS sensor and a grating ruler body, the CMOS sensor reads an upper and a lower sample windows, and due to an angle existing between the grating ruler body and the CMOS sensor, a difference exists between the numbers of the upper and lower sample windows, and by continually adjusting the grating ruler body or the CMOS sensor, the code reading difference minimized so that the angle is zeroed; (2) when mounting the grating ruler body and a mechanic housing, it is moved by a fixed displacement in a motion direction, and a grating encoding reading is recorded and an error compensating amount is obtained which serves as error compensation value in an actual motion to correct a cumulative error introduced by the angle between the grating ruler body and the motion direction.

4 Claims, 2 Drawing Sheets

(56) References Cited

U.S. PATENT DOCUMENTS

2010/0315910 A1* 12/2010 Lee .................. B82Y 10/00
369/13.11
2013/0292557 A1* 11/2013 Nakamura ......... G01D 5/34776
250/231.1

FOREIGN PATENT DOCUMENTS

| | | | |
|---|---|---|---|
| CN | 103175567 | A | 6/2013 |
| CN | 103512500 | A | 1/2014 |
| CN | 103759660 | A | 4/2014 |
| EP | 0660085 | A1 | 6/1995 |

OTHER PUBLICATIONS

International Search Report for Application No. PCT/CN2015/071694 dated May 4, 2015.

* cited by examiner

METHOD OF ASSISTED MOUNTING AND ERROR COMPENSATION FOR ABSOLUTE GRATING RULER

CROSS REFERENCE TO RELATED APPLICATIONS

The present application is a national phase entry under 35 U.S.C. §371 of International Application No. PCT/CN2015/071694, filed Jan. 28, 2015, which claims priority from Chinese Patent Application No. 201410040694.1, filed Jan. 28, 2014.

TECHNICAL FIELD

The present invention relates to a method for assisted mounting and error compensation for absolute grating ruler, and the method is suitable to correct and compensate mounting-possess-caused straightness errors of absolute position encodes that employ CMOS/CCD sensors. Aiming at this phenomenon, the method of the invention may automatically calculate the deviation angles of the CMOS sensor and the grating ruler body during the mounting, and carry out an assisted mounting and correct parallelism errors. Meanwhile, the method also provides an error compensation in the case that the parallelism errors between the grating ruler body and the reference direction cannot be corrected. It is an assisted mounting and error compensating method for position encoding of high precision absolute grating ruler.

BACKGROUND

A gating ruler (also known as grating ruler displacement sensor or grating ruler sensor) is a measurement feedback device which operates using the optical principles of grating; the grating ruler may serve to detect a linear displacement or an angular displacement, and it is typically used in closed loop servo-system for numerically controlled machine tool.

At present, the grating rulers are mainly divided into three general categories, the incremental grating ruler, the absolute grating ruler, and the incremental grating with distance code reference marks. The position detecting signals of the grating ruler are divided into two categories, the incremental count output and the absolute value output; for the former, it is required to calculate the numbers of the output impulses to determine the actual position, and thus it is referred to as incremental grating ruler; the output signal of the latter may directly reflect the actual position, and thus it is referred to as absolute grating ruler.

As the processing industries become more precise, the role of the grating ruler in the field of processing feedback is more and more significant; meanwhile, in order to increase the processing precision, to reduce cumulative errors and to avoid complicated steps of startup and positioning, etc., the advantages of the absolute grating ruler become more and more obvious.

Although the absolute grating ruler has significant advantages over the incremental grating ruler, its implementation requires a reliable mechanic structure, and its requirements for mounting process are stricter than the incremental grating ruler. In particular for CMOS/CCD sensor-based absolute grating ruler, relatively high requirements are imposed on the optical depth of field, the straightness of the grating ruler body, and the parallelism between the CMOS sensor and the ruler body. If there is an angle between the mounted ruler body and the CMOS, then decoding errors may occur, and if the straightness of the ruler body is not adequate, then a cumulative error will occur. The present invention may solve this problem.

SUMMARY OF THE INVENTION

The invention provides a method for assisted mounting and error compensation for absolute grating ruler, and the method may automatically calculate the deviation angles between the CMOS sensor and the grating ruler body during the mounting, carry out an assisted mounting and compensate parallelism errors. Meanwhile, the method also provides an error compensation in the case that the parallelism errors between the grating ruler body and the reference direction cannot be corrected.

The method for assisted mounting and error compensation for absolute grating ruler of present invention comprises the following:

(1) when mounting a CMOS sensor and a grating ruler body, the CMOS sensor reads an upper and a lower sample windows, and due to an angle existing between the grating ruler body and the CMOS sensor, a difference exists between the numbers of the upper and lower sample windows, and by continually adjusting the grating ruler body or the CMOS sensor, the code reading difference is made minimal so that the angle existing between the grating ruler body and the CMOS sensor is zeroed;

(2) when mounting the grating ruler body and a mechanic housing, it is moved by a fixed displacement in a motion direction, and a grating encoding reading is recorded and an error compensating amount is obtained which serves as error compensation value in an actual motion to correct a cumulative error introduced by the angle between the grating ruler body and the motion direction.

A code track height distance between the sample window and the lower sample window is set to $\Delta h$, the CMOS sensor obtains an upper sample window, a sample omitting window and a lower sample window which together constitute an image captured by the CMOS sensor, and an upper absolute position Xup is read in the upper sample window, and a lower absolute position Xdown is read in the lower sample window, and the position of the upper absolute position in the lower sample window is Xmap, the upper absolute position and the lower absolute position are connected as a code reading reference line, and the upper absolute position and the position of the upper absolute position in the lower sample window are connected as a tilt angle indicating line, and a CMOS straightness error $\Delta L$ is calculated:

$$\Delta L = X\text{map} - X\text{down} = X\text{up} - X\text{down}.$$

The above described code track height is a set value, thus in a triangle constituted by the reference line, the tilt angle indicating line and the CMOS straightness error $\Delta L$, the following equation applies:

$$\phi 1 = \text{Arctan}(\Delta L/\Delta h).$$

Assuming the size of minimal CMOS pixel is $\delta$, the angle resolution is $\theta$min $$\theta\text{min} = \text{Arctan}(\delta/\Delta h).$$

By continuously capturing grating patterns and calculating the CMOS tilt angle $\phi 1$ by the processor, the degree of parallelism between the CMOS image sensor and the grating ruler body may be known, and by external adjustment, the CMOS tilt angle $\phi 1$ is continually reduced.

The angle $\phi 2$ between the tilted grating ruler and the motion reference direction is the grating ruler body tilt angle, and when the grating ruler is actually moved forward by Lmov, the actual grating ruler reading should be Xmov, the code reading on the tilted grating ruler is Xerr and the code reading mapped onto the reference direction is Xread, and the following equation applies:

$$Xread=Xerr.$$

The code reading error is $\Delta X$, $$\Delta X=Xread-Xmov=Xerr-Xmov$$

$$Cos(\phi 2)=Lmov/Xread.$$

If the code reading at a certain position is X, then the compensated absolute position L is:

$$L=X\cdot Cos(\phi 2)=(X\cdot Lmov)/Xread.$$

For absolute position encoder employing CMOS/CCD sensors, it is required to strictly ensure the degree of parallelism between the CMOS sensors, the grating ruler body and the motion direction. However, in the existing mounting processes, it is difficult to ensure the parallelism of the three at the same time, which causes large decoding errors and cumulative errors. In order to solve the above problems, the invention provides a method for assisted mounting and error compensation for absolute grating ruler, and the method may automatically calculate the deviation angles between the CMOS sensor and the grating ruler body during the mounting, and carry out an assisted mounting and correct parallelism errors. Meanwhile, the method also provides an error compensation in the case that the parallelism errors between the grating ruler body and the reference direction cannot be corrected. In comparison with the prior art, the invention has the following advantages:

1). The invention requires no external measuring devices, and may autonomously detect the tilt angle between the CMOS sensor and the grating ruler body.

2). The invention carries out an assisted mounting before the error compensation, so that an error factor introduced by non-parallelism between multiple structures is eliminated.

3). The invention utilizes the characteristic that the output signal of the absolute grating ruler is an absolute position, and utilizes the tilt angle as an error compensation parameter, and the compensating amount also has an absolute nature.

DETAILED DESCRIPTION OF THE INVENTION

Figure 1:
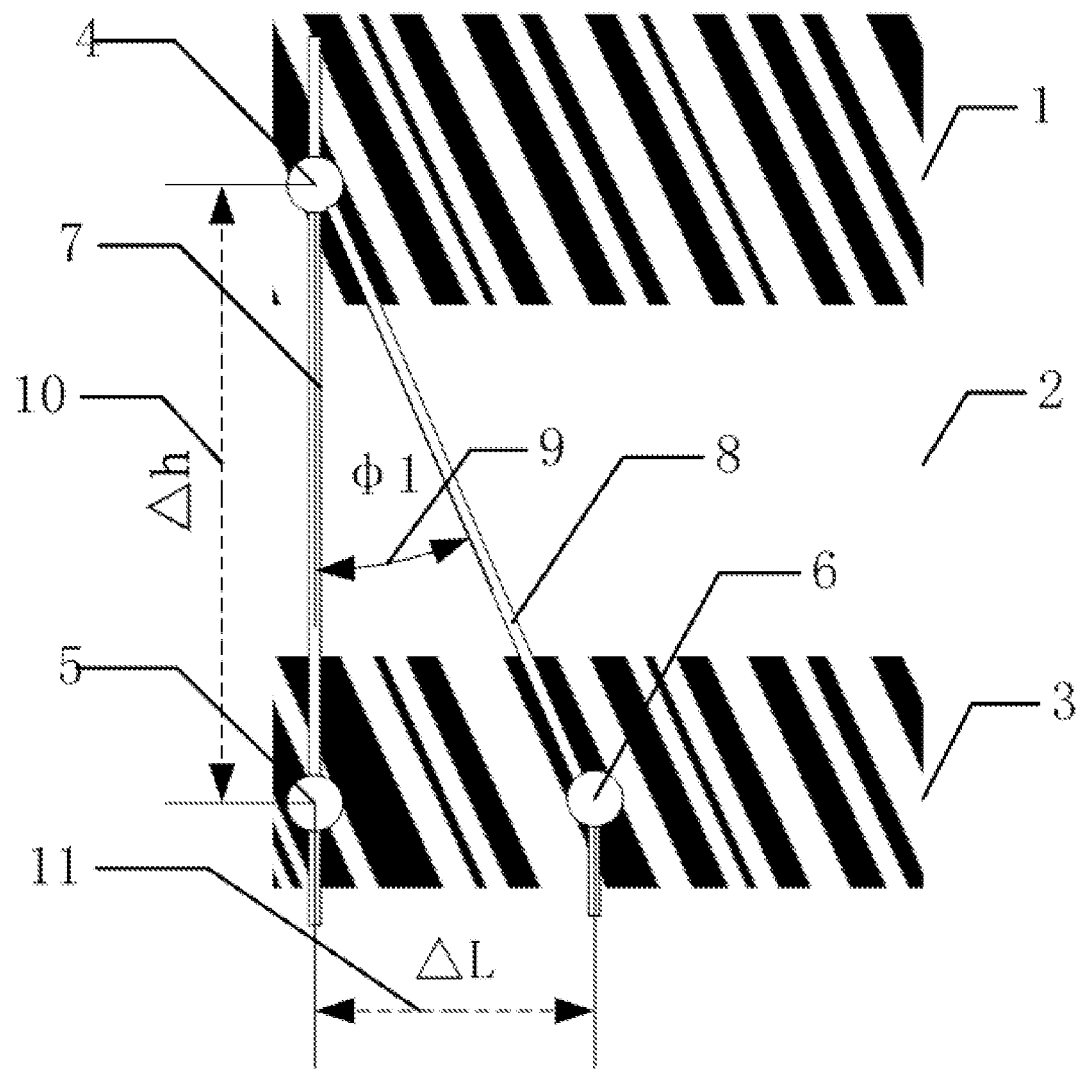
FIG. 1 is a schematic view of the tilt angle between the CMOS and the ruler body of the invention.

After the CMOS image sensor, the grating ruler body and the housing are mounted, a code track height distance is set to Ah, as shown at position 10 in the figure. The CMOS image sensor obtains a sample window 1, a sample omitting window 2 and a lower sample window 3, which together constitute an image captured by the CMOS sensor. As shown in FIG. 1, a grating pattern is illustrated for the case that a tilt angle exists between the CMOS sensor and the grating ruler body.

Wherein the upper sample window 1, the sample omitting window 2 and the lower sample window 3 together constitute an image captured by the CMOS sensor. The upper sample window 1 reads an upper absolute position Xup as shown at position 4 in the figure, the lower sample window 3 reads a lower absolute position Xdown as shown at position 5 in the figure, and the position of Xup in the lower sample window 3 is Xmap as shown at position 6 in the figure. A code reading reference line 7 connects 4 and 5, and a tilt angle indicating line 8 connects 4 and 6. The code reading reference line 7 is perpendicular to the width direction of the CMOS imaging surface, and angle between the code reading reference line 7 and the tilt angle indicating line 8 is $\phi 1$ as shown at position 9 in the figure; the longitudinal distance between 4 and 5 is code track height $\Delta h$ as shown at position 10 in the figure; and the distance between Xdown and Xmap is the CMOS straightness error $\Delta L$ as shown at position 11 in the figure.

Figure 2:
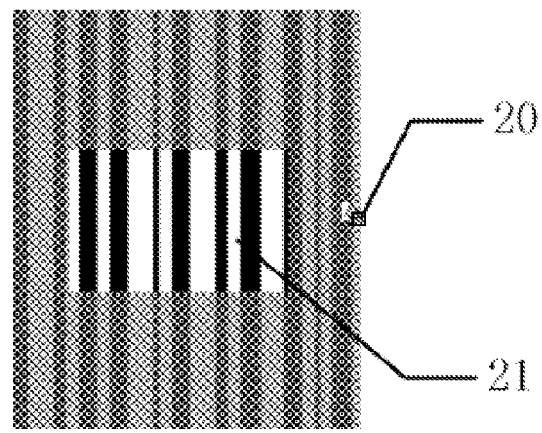
FIG. 2 is a schematic view without tilt angle between the CMOS and the ruler body of the invention.

Because a tilt angle exists between the CMOS sensor and the grating ruler body, the CMOS sensor obtains a pattern in FIG. 2, and the corresponding actual position of the absolute position Xup obtained in the upper sample window 1 (as shown at position 4 in the figure) in the lower sample window 3 should be Xmap, as shown at position 6 in the figure. However, the CMOS decoding starts the decoding from the position where the code reading reference line 7 lies, and the lower sample window 3 will obtain Xdown, therefore, the distance between Xdown and Xmap is $$\Delta L=Xmap-Xdown=Xup-Xdown.$$

The code track height $\Delta h$ is a set value, thus in a triangle constituted by the reference line 7, the tilt angle indicating line 8 and the CMOS straightness error $\Delta L$, the following equation applies:

$$\phi 1=Arctan(\Delta L/\Delta h).$$

Assuming the size of minimal CMOS pixel is s, the angle resolution is $\theta min$ $$\theta min=Arctan(\delta/\Delta h).$$

By continuously capturing grating patterns and calculating the tilt angle $\phi 1$ of CMOS as shown at position 9 in the figure by the processor, the degree of parallelism between the CMOS image sensor and the grating ruler body may be known. By external adjustment, the CMOS tilt angle $\phi 1$ may be continually reduced.

In FIG. 2, a grating pattern is shown after correcting the parallelism error between the CMOS sensor 21 and the grating ruler body 20.

Figure 3:
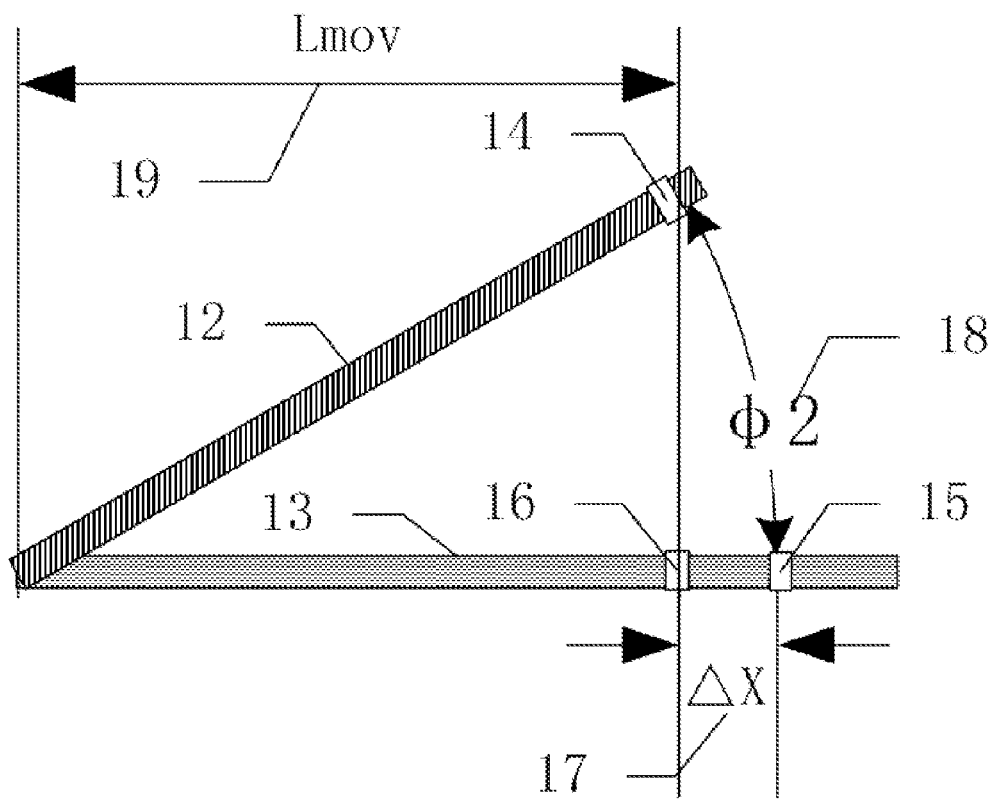
FIG. 3 is a schematic view of the straightness of the grating ruler body of the invention.

In FIG. 3, the angle between the tilted grating ruler 12 and the motion reference direction 13 is the grating ruler body tilt angle $\phi 2$ as shown at position 18 in the figure. When the grating ruler is actually moved forward by Lmov as shown at position 19 in the figure, the actual grating ruler reading should be Xmov as shown at position 16 in the Figure, the code reading on the tilted grating ruler 12 is Xerr as shown at position 14 in the figure, and the code reading mapped onto the reference direction 13 is Xread as shown at position 15 in the figure. And, the following equation applies $$Xread=Xerr.$$

The code reading error is $\Delta X$ as shown at position 17 in the figure, and the following equations apply $$\Delta X=Xread-Xmov=Xerr-Xmov$$

$$Cos(\phi 2)=Lmov/Xread.$$

If the code reading at a certain position is X, then the compensated absolute position L is:

$$L=X\cdot Cos(\phi 2)=(X\cdot Lmov)/Xread.$$

The invention claimed is:

1. A method for assisted mounting and error compensation for absolute grating ruler, characterized in that the method for assisted mounting and error compensation comprises the following:

(1) when mounting a CMOS sensor and a grating ruler body, the CMOS sensor reads an upper and a lower sample windows, and due to an angle existing between the grating ruler body and the CMOS sensor, a difference exists between the numbers of the upper and lower sample windows, and by continually adjusting the grating ruler body or the CMOS sensor, the code reading difference is made minimal so that the angle existing between the grating ruler body and the CMOS sensor is zeroed;

(2) when mounting the grating ruler body and a mechanic housing, it is moved by a fixed displacement in a motion direction, and a grating encoding reading is recorded and an error compensating amount is obtained which serves as error compensation value in an actual motion to correct a cumulative error introduced by the angle between the grating ruler body and the motion direction.

2. The method for assisted mounting and error compensation for absolute grating ruler of claim 1, characterized in that, a code track height distance between the sample window and the lower sample window should be set to $\Delta h$, the CMOS sensor obtains an upper sample window, a sample omitting window and a lower sample window which together constitute an image captured by the CMOS sensor, and an upper absolute position Xup is read in the upper sample window, and a lower absolute position Xdown is read in the lower sample window, and the position of the upper absolute position in the lower sample window is Xmap, the upper absolute position and the lower absolute position are connected as an code reading reference line, and the upper absolute position and the position of the upper absolute position in the lower sample window are connected as an tilt angle indicating line, and a CMOS straightness error $\Delta L$ is calculated:

$$\Delta L = X\text{map} - X\text{down} = X\text{up} - X\text{down}.$$

3. The method for assisted mounting and error compensation for absolute grating ruler of claim 2, characterized in that, the code track height is a set value, thus in a triangle constituted by the reference line, the tilt angle indicating line and the CMOS straightness error $\Delta L$, the following equation applies:

$$\phi 1 = \text{Arctan}(\Delta L/\Delta h),$$

and assuming the size of minimal CMOS pixel is $\delta$, the angle resolution is $\theta\text{min}$:

$$\theta\text{min} = \text{Arctan}(\delta/\Delta h),$$

by continuously capturing grating patterns and calculating the CMOS tilt angle $\phi 1$ by the processor, the degree of parallelism between the CMOS image sensor and the grating ruler body may be known, and by external adjustment, the CMOS tilt angle $\phi 1$ is continually reduced.

4. The method for assisted mounting and error compensation for absolute grating ruler of claim 1, characterized in that, the angle $\phi 2$ between the tilted grating ruler and the motion reference direction is the grating ruler body tilt angle, and when the grating ruler is actually moved forward by Lmov, the actual grating ruler reading should be Xmov, the code reading on the tilted grating ruler is Xerr and the code reading mapped onto the reference direction is Xread, and the following equation applies:

$$X\text{read} = X\text{err},$$

the code reading error is $\Delta X$, $$\Delta X = X\text{read} - X\text{mov} = X\text{err} - X\text{mov}$$

$$\text{Cos}(\phi 2) = L\text{mov}/X\text{read},$$

and if the code reading at a certain position is X, then the compensated absolute position L is:

$$L = X \cdot \text{Cos}(\phi 2) = (X \cdot L\text{mov})/X\text{read}.$$

* * * * *